United States Patent [19]

Nalewajek

[11] 4,405,568

[45] Sep. 20, 1983

[54] RECOVERY OF GADOLINIUM AND GALLIUM OXIDES

[75] Inventor: David Nalewajek, West Seneca, N.Y.

[73] Assignee: Allied Corporation, Morris Township, Morris County, N.J.

[21] Appl. No.: 451,297

[22] Filed: Dec. 20, 1982

[51] Int. Cl.³ ...................... C01F 17/00; C01G 15/00
[52] U.S. Cl. .................................. 423/21.1; 423/122; 423/127; 423/132; 423/111
[58] Field of Search ...................... 423/21.1, 111, 122, 423/125, 127, 132

[56] References Cited

U.S. PATENT DOCUMENTS

| | | | |
|---|---|---|---|
| 3,506,585 | 4/1970 | Otsuka et al. | 423/21.1 |
| 4,094,753 | 6/1978 | Charlton et al. | 204/105 R |
| 4,198,231 | 4/1980 | Gusset | 423/21.1 |
| 4,375,453 | 3/1983 | Nalewajek et al. | 423/21.1 |

FOREIGN PATENT DOCUMENTS 21990  1/1981  European Pat. Off. ............ 423/112

OTHER PUBLICATIONS

02599 D/03, Rhone–Poulenc Industries.

45734 B/25, Schweizerische Alum.
Schultze et al., "Chemical Absts.", vol. 85, 1976, #66231n.

*Primary Examiner*—Herbert T. Carter
*Attorney, Agent, or Firm*—Arthur J. Plantamura; Jay P. Friedenson

[57] ABSTRACT

A process is described whereby the "saw kerf" can be reprocessed in sufficient purity to be re-used in the process, thereby improving the economics of production of GGG wafers significantly. Gadolinium and gallium oxides are recovered and separated from transition metal impurities introduced during fabrication of GGG wafers. The process "saw kerf" produced from slicing the crystal boule is dissolved by refluxing in $HNO_3$, treated with oxalic acid and the resulting oxalates and nitrates separated. Pyrolysis of these salts at temperatures of at least 850° C. resulted in their conversion to $Ga_2O_3$ of purity $>99.99\%$. The process can be extended to include purification and re-use of by-products generated in other grinding and polishing operations which may result in the recycling of the order of 80% of the generated by-products.

3 Claims, No Drawings

RECOVERY OF GADOLINIUM AND GALLIUM OXIDES

DESCRIPTION

This invention relates to a process whereby gadolinium and gallium by-products generated during fabrication of GGG wafers can be separated and recovered in an acceptable purity to be recycled in the process. In particular, the GGG by-products are transformed into compounds which can be conveniently separated from each other and from transition metal impurities based on their solubilities. Specifically, the gadolinium is converted to the oxalate salt and the gallium to the nitrate salt. These compounds are readily converted into high purity oxides.

BACKGROUND OF THE INVENTION

Bubble domain technology requires the deposition of iron garnet films of high perfection on single crystal substrates. These substrate crystals have to be of equal perfection as that required for the epilayer, and must be perfectly matched with their lattice constants to the film material and vice versa. In the course of technical development, wafers of gadolinium-gallium-garnet (GGG) material has proven to be very attractive. Efforts have concentrated on this material and it has emerged as the prime substrate for bubble domain memory work.

The standard technology used for the preparation of single crystals and wafers of GGG results in the generation of 80% by-products. These by-products are contaminated with a variety of non-transition and transition metal impurities introduced during fabrication. Since the presence of impurity ions in the crystal alter the lattice constants and render the substrate unusable for bubble domain material, the by-products could not be reintroduced into the production cycle. As this scrap consists of relatively expensive starting materials, the development of process technology to purify this material by a practical procedure has considerable economic value.

In U.S. Pat. No. 4,198,231 a method that involves digesting the scrap material, precipitating the gadolinium and electrolytically depositing the gallium is disclosed. Attempts at liquid-liquid extraction of the gadolinium gallium garnet residues dissolved in HCl and in $HNO_3$ have also been attempted. However, the economics of processes requiring either liquid-liquid extractions of electrolytic deposition of the product associated with the recovery of gallium have rendered such methods impractical on an industrial scale. In the pending U.S. patent application No. 334,719 filed on Dec. 28, 1981, now U.S. Pat. No. 4,375,453, a process is described involving the digestion of the scrap, precipitation of the gadolinium and gallium as sulfate and oxalate salts and pyrolysis to convert them to the oxides. While this latter method is more cost effective, the present application provides an alternative method which is also efficient and economical and in various respects is more applicable to existing production facilities.

SUMMARY OF THE INVENTION

Important aspects of the invention reside in the fact that reprocessing of the by-products is accomplished by using inexpensive raw materials for dissolution, precipitation and isolation. Furthermore, by employing selective acids, precipitation of only the desired salts of gadolinium and gallium can be attained free of transition metal impurities deleterious to the growth of GGG crystals.

The by-product material, consisting of $Gd_3Ga_5O_{12}$, to be reclaimed is separated from lubricating oil by vacuum filtration, thermally treated to remove any remaining organic substrate which adheres to the particles, is dissolved in mineral acids and, after digestion to ensure maximum dissolution, the solution is filtered to remove insoluble particles. The gadolinium and gallium salts are then precipitated from the particle free solution by means which involve the isolation of gadolinium as the oxalate and gallium essentially as the nitrate followed by their conversion to the oxides.

The precipitation and separation of gadolinium oxalate from gallium nitrate and impurities is performed in an acidic medium at a pH~0.5 by adding oxalic acid, in an approximate 1.5 stoichiometric excess, to the filtrate to precipitate the insoluble gadolinium oxalate compound, $Gd_2(C_2O_4)_3$, as a microcrystalline solid. The precipitate is stirred and separated from the mother liquor and impurities by conventional methods. The cake of gadolinium oxalate which is obtained is washed to remove traces of mother liquor, dried, and calcined to gadolinium oxide.

The mother liquor filtrate from the gadolinium oxalate is reduced in volume by distillation, to precipitate gallium nitrate and gallium oxalate. The gallium salts precipitate as a microcrystalline solid, are separated from the soluble transition metal impurities by conventional filtration techniques, washed with water and dried in a vacuum oven. The total yield from this process is in the order of and may exceed 85%.

DETAILED DESCRIPTION OF THE INVENTION

While the process of the invention is described specifically with reference to the residue or "saw kerf", derived from slicing the crystal boules into wafers, the invention can be extended to include the purification of by-products generated in other manufacturing stages. Minor revisions in the pre-treatment of the by-products may be necessary. These can include: (a) grinding (ball milling) of boule heels or boule ends before dissolution; (b) cracking of these same boule entities by thermal shock treatment before dissolution or (c) washing the by-products generated during polishing steps with a liquid organic, e.g., a chlorofluorocarbon solvent, to eliminate lubricating oils.

In the reprocessing saw kerf, the material to be reclaimed is separated from lubricating oil by vacuum filtration and then thermally treated at temperatures of about 700° C. for a period of at least one hour to remove any remaining organic substrate which adheres to the particles. This treated material, which consists of gadolinium-gallium oxide, $Gd_3Ga_5O_{12}$, and transition metal impurities identified as magnesium, nickel, zirconium, aluminum, iron and silicon, as well as diamond dust and aluminum oxide particles, is dissolved by refluxing in nitric acid for a suitable period of time, preferably at least one hour. After digestion to ensure maximum dissolution, the solution is filtered to remove insoluble particles. These particles consist mainly of diamond dust, aluminum oxide and $Gd_3Ga_5O_{12}$ of particle size >250 $\mu$ m. If substantial amounts of $Gd_3Ga_5O_{12}$ are collected on the filter, they can be ground to a smaller size and treated again with nitric acid. However, this is not usually observed when dealing with saw kerf. The gadolinium is precipitated from the particle free solution as the oxalate salt while the gallium is isolated as the nitrate salt. These intermediates are converted to high purity oxides as described below.

The precipitation and isolation of gadolinium from gallium and from transition metal impurities is based on the insolubility of gadolinium oxalate, $Gd_2(C_2O_4)_3$, at low pH (0.5–1.0). The gallium is isolated free of transition metal impurities by fractional crystallization resulting from volume reductions of the filtrate.

After pre-treating the saw kerf and dissolving in nitric acid as discussed above, oxalic acid is added to the filtrate to precipitate from the filtrate the insoluble gadolinium oxalate, $Gd_2(C_2O_4)_3$, as a fine, white, microcrystalline solid. The precipitate which forms immediately is stirred for 4 hours and separated from the mother liquor and the transition metal impurities (which remain soluble) by conventional methods, either vacuum filtration or centrifugation. The cake of gadolinium oxalate, thus obtained, is washed with a water solution containing 2% by weight of oxalic acid. The total yield of gadolinium oxalate from this procedure is of the order of and may exceed 95%.

The gadolinium oxalate is calcined at temperatures of at least 850° C. to gadolinium oxide $Gd_2O_3$, in $\geq 95\%$ yield and of a 99.99% purity level.

The filtrate from the first step containing gallium nitrate is reduced about 70% in volume by distillation whereupon the gallium nitrate, $Ga(NO_3)_3$ and any gallium oxalate, $Ga_2(C_2O_4)_3$ present precipitate from the solution.

The mixture is filtered, washed with water and the residue pyrolyzed between 850°–950° C. The pyrolysis of this gallium nitrate salt, $Ga(NO_3)_3$, results in the isolation of gallium oxide, $Ga_2O_3$, in $>85\%$ yield and $\sim 99.99\%$ purity.

The several features and advantages of the invention will be apparent in greater detail by the following examples. It will be understood, however, that although these examples may describe in detail certain preferred operation conditions of the invention, they are given primarily for purposes of illustration and the invention in its broad aspects is not limited thereto.

EXAMPLE 1

Dried saw kerf, recovered from gadolinium gallium garnet, $Gd_3Ga_5O_{12}$, of composition 54% gadolinium oxide and 46% gallium oxide, was thermally treated at 700° C. for 3 hours to decompose volatile impurities. 100 grams of the thermally treated material, with a particle size $\leq 250$ $\mu$m, was refluxed for 1.5 hours in 250 mL of 70% nitric acid. The solution which contained gadolinium nitrate and gallium nitrate, in addition to transition metal nitrates, was filtered to remove 2.7 gms of insoluble particles.

This particle free solution was heated to 80° C. then treated with 223g of solid oxalic acid. The mixture was stirred for 1 hour at 80° C. then 8 hours at ambient temperature and filtered. The filter cake was slurried in 400mL of water containing 2% by weight of oxalic acid. Filtration and pyrolysis resulted in the isolation of 49g (95%) of gadolinium oxide, $Gd_2O_3$. Purity based on trace metal analysis was 99.997%.

The combined filtrates obtained were reduced in volume to 100–200mL. The white solid gallium nitrate salt which precipitated was cooled to 5° C., filtered, washed with 50mL of ice water and pyrolyzed. The pyrolysis was performed first at 250° C. for 3 hours to decompose the gallium nitrate to the oxide, then at 900° C. for 4 hours to ensure all organic material (oxalic acid) which co-precipitated was decomposed. This resulted in the isolation of 40g (87%) of gallium oxide, $Ga_2O_3$. Purity based on trace metal analysis was 99.99%.

It will be understood that variations may be made in the several conditions and ranges disclosed and that these disclosed limitations, provided in order to more particularly describe the invention, should not be regarded as limitations except as set forth in the claims which follow:

What is claimed is:

1. A method for recovering gadolinium and gallium oxides from by-product material which contains both of these oxides and various impurities comprising the steps of:
   (a) thermally treating the oxides to remove organic impurities,
   (b) refluxing the gadolinium and gallium oxide in nitric acid,
   (c) isolating the filtrate and precipitating gadolinium oxalate from said filtrate by adding thereto oxalic acid,
   (d) separating, washing and drying the precipitated gadolinium oxalate,
   (e) converting the gadolinium oxalate from step (d) to gadolinium oxide by pyrolysis,
   (f) distilling the filtrate from step (c) to reduce the volume and thereby precipitate therefrom gallium nitrate and any gallium oxalate present,
   (g) separating the precipitate from step (f),
   (h) washing and drying the gallium salts obtained in step (f), and
   (i) calcining the precipitate from step (h) to form gallium oxide.

2. The method of claim 1 wherein the refluxing of the oxides of step (b) is conducted for a period of at least one hour.

3. The method of claim 2 wherein the oxides refluxed in nitric acid are first pretreated at a temperature of about 700° C. for a period of at least two hours.

* * * * *